Figure 1:
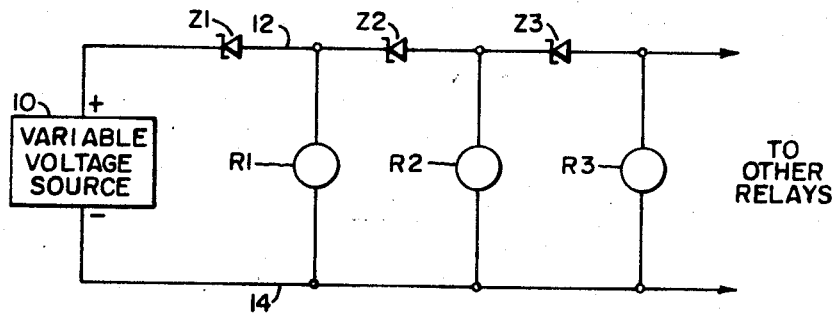

United States Patent [19]

Matty et al.

[11] 3,736,438
[45] May 29, 1973

[54] APPARATUS FOR SEQUENTIALLY ENERGIZING ELECTRICAL UTILIZATION DEVICES

[75] Inventors: Thomas C. Matty; Robert H. Perry, both of East Pittsburgh, Pa.

[73] Assignee: Westinghouse Electric Corporation, Pittsburgh, Pa.

[22] Filed: July 29, 1971

[21] Appl. No.: 167,139

[52] U.S. Cl..............307/130, 317/DIG. 5, 317/137
[51] Int. Cl..............................................H01h 47/00
[58] Field of Search...................317/DIG. 5; 307/130

[56] References Cited

UNITED STATES PATENTS 3,537,757  11/1970  Griffin............................317/DIG. 5
2,948,843  8/1960  Klein..................................317/31
3,302,070  1/1967  Burley...........................317/DIG. 5

OTHER PUBLICATIONS

Silicon Zener Diode and Rectifier Handbook, 2nd edition, 1961, Motorola, Inc. (Page 115)

Primary Examiner—L. T. Hix
Attorney—F. H. Henson, R. G. Brodahl and Jack M. Arnold

[57] ABSTRACT

Apparatus for energizing in sequence each of a plurality of electrical utilization devices, such as relays, with the use of reverse voltage breakdown elements. The invention finds particular, but by no means exclusive, utility in the control of vehicles in a train of vehicles, each of which is driven by its own separate drive motor means (e.g., a subway train).

3 Claims, 3 Drawing Figures

Patented May 29, 1973

3,736,438

APPARATUS FOR SEQUENTIALLY ENERGIZING ELECTRICAL UTILIZATION DEVICES

BACKGROUND OF THE INVENTION

As is known, there are certain applications where it is desired to energize electrical utilization devices, such as relays, in sequence. For example, in the control of an electrical subway train, it is desirable to increase or decrease the torque exerted by the drive motors for the respective cars of the train in sequence, starting from one end of the train and rapidly progressing through each car to the other end. This eliminates or reduces jerks due to play in the couplers of the train and improves the smoothness of the ride. Any control system of this type for a subway train should use as few control conductors as possible and, at the same time, must be capable of control from either end of the train.

SUMMARY OF THE INVENTION

In accordance with the present invention, a system is provided for energizing electrical utilization devices in sequence from a common source of potential with the use of reverse breakdown voltage devices, preferably Zener diodes. A feature of the invention resides in the ability to energize the utilization devices, which are all adapted to be connected in parallel circuit relationship across common power leads, by simply applying a potential source to either end of a string of such devices. In the case of a subway train, for example, this feature enables control from either end of the train.

Specifically, there is provided a pair of power conductors, a plurality of electrical utilization devices connected in parallel circuit relationship across the conductors, and means including a reverse voltage breakdown device associated with each utilization device for causing the utilization devices to become energized in sequence as the voltage across the power conductors is increased.

In certain embodiments of the invention, a Zener diode is connected in series with each relay, the series combination being connected across power conductors. As the voltage applied across the conductors increases, successive ones of the Zener diodes will break down to trigger their associated utilization devices. It is also possible to include the Zener diodes in one of the two power leads for the utilization devices. In still another embodiment of the invention, the utilization devices, such as relays, are connected in series with a transistor switch or the like between the power conductors; while the Zener diode for each utilization device is included in a voltage divider arrangement connected between the power leads, a point on the voltage divider being connected to the base or control electrode of the aforesaid switch such that when the Zener diode breaks down, the switch in series with the utilization device will be turned off.

Figure 2:
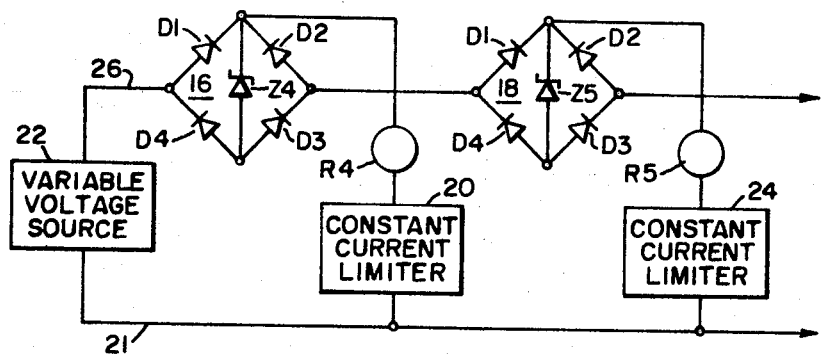
Figure 3:
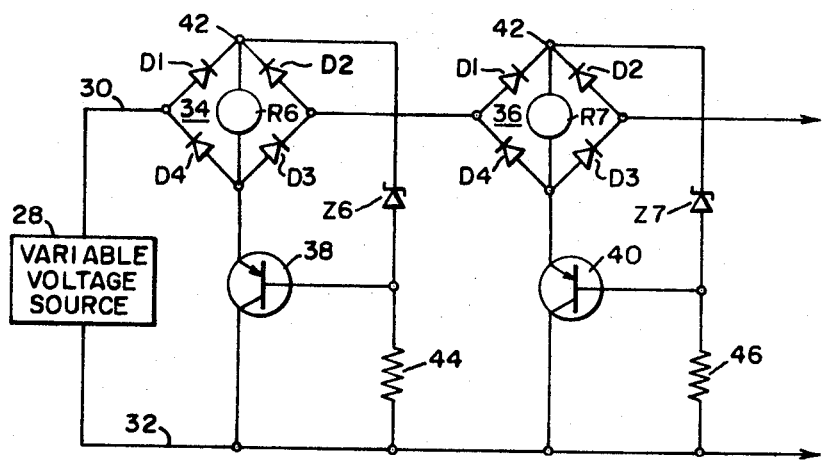

The above another objects and features of the invention will become apparent and other the following detailed description taken in connection with the accompanying drawings which form a part of this specification, and in which:

FIG. 1 illustrates a simplified form of the invention wherein Zener diodes are included in one of two power leads for a plurality of relays;

FIG. 2 illustrates an embodiment of the invention wherein a diode bridge is placed around each Zener diode in order that the utilization devices can be energized from either end of a string of parallel-connected devices; and FIG. 3 illustrates still a further embodiment of the invention wherein an electrical utilization device is surrounded by a diode bridge, and wherein the utilization device is turned ON by means of a transistor switch controlled by the Zener diode.

With reference now to the drawings, and particularly to FIG. 1, there are shown three electrical utilization devices, such as relays R1, R2 and R3 which are to be energized in sequence (i.e., one after the other) from a variable voltage source 10. The variable voltage source 10 can produce a stepped or ramp-type output and is adapted to be connected to the relays R1, R2 and R3 through two power leads or conductors 12 and 14. Conductor 12 has included therein three Zener diodes Z1, Z2 and Z3, the first Zener diode Z1 being connected between the variable voltage source 10 and relay R1 and the Zener diodes Z2 and Z3 being connected between relays R1 and R2 and relays R2 and R3, respectively. Additional Zener diodes and relays may be connected to the power leads 12 and 14, depending upon the number of relays or other utilization devices required for a particular application.

With no voltage applied from the variable voltage source 10, all relays R1 through R3 will be deenergized. If, however, the voltage from source 10 is increased by an amount sufficient to break down the first Zener diode Z1, then the first relay R1 will become energized. If another equal voltage step is applied, then the second Zener diode Z2 will break down and the first two relays R1 and R2 will be energized. Similarly, when the voltage from source 10 is again increased to the point where all three Zener diodes Z1-Z3 have broken down, then all relays R1-R3 will be energized, and so on. In the case of a subway train, for example, if each Zener diode and its associated relay are in a separate car of the train, then the cars may be addressed progressively from the front by applying progressively increasing voltage steps.

The system of FIG. 1, while workable, requires that each Zener diode be correctly oriented in the series chain. That is, with an arrangement of this type, the cathode of one Zener diode must be connected to the anode of the next; and, in the case of a subway train, this means that a car cannot be reversed with respect to its original orientation. This condition can be overcome with the arrangement shown in FIG. 2 wherein diode bridges 16 and 18 are placed around each of two Zener diodes Z4 and Z5. Each bridge 16 and 18 is comprised of four diodes D1, D2, D3 and D4 connected in a usual diode bridge arrangement, the Zener diode being connected between two terminals of the bridge. The cathode of Zener diode Z4 is connected through a relay R4 and a constant current limiter 20 to a power lead 21 connected to one terminal of a variable voltage source 22. Similarly, the cathode of Zener diode Z5 is connected through relay R5 and constant current limiter 24 to the power lead 21. The two diode bridges 16 and 18 are connected in series in power lead 26; while the second power lead 21 is connected to the other terminal of the voltage source 22.

With the arrangement shown, and assuming that the upper terminal of the voltage source is positive with respect to its lower terminal as shown in FIG. 2, current can flow through diode D1 to energize relay R4. As the voltage is increased, Zener diode Z4 will break down to permit current to flow through diode D1 in bridge 16, Zener diode Z4, diode D3 in bridge 16 and diode D1 in bridge 18 to energize relay R5. Upon reversal of the voltage from source 22, current can flow through diode D2, the Zener diode and diode D4 in both bridge circuits 16 and 18. Again, as the voltage from voltage source 22 is increased with the aforesaid reversed polarity, Zener diode Z4 will break down first, followed by break down of Zener diode Z5; and when each Zener diode breaks down, a succeeding relay is energized. As will be appreciated, additional bridge circuits, Zener diodes and relays can be added to the power leads 21 and 26; and these additional relays will be energized in sequence as the voltage from source 22 is increased. With the arrangement of FIG. 2, the voltage source 22 can be applied from either end of a string of relays (e.g., either end of a train) and with either polarity. Of course, if it is applied from the other end of the string, the sequential energization of relays will be reversed.

When a large number of relays in a chain such as that shown in FIG. 2 is energized, the first relay could be subjected to very high voltage and current conditions. This would result in excessive power dissipation and possible burn-out of the relays R4 and R5. As mentioned above, however, the constant current limiters 20 and 24 prevent this condition.

In the embodiment of the invention shown in FIG. 3, a variable voltage source 28 is again connected to two power leads 30 and 32. Included in series in power lead 30 are two diode bridge circuits 34 and 36 each comprised of four diodes D1-D4 placed around a relay R6 or R7. The relays R6 and R7 are connected in series with PNP transistors 38 and 40 between the upper terminal 42 of each bridge 34 or 36 and the power lead 32. The upper terminal 42 of the bridge 34 is connected through a voltage divider arrangement comprising Zener diode Z6 and resistor 44 to the power lead 32, the junction of Zener diode Z6 and resistor 44 being connected to the base of transistor 38. In a similar manner, terminal 42 of bridge circuit 36 is connected through Zener diode Z7 and the resistor 46 to the power lead 32, the junction of Zener diode Z7 and resistor 46 being connected to the base of transistor 40.

Because of the diode bridges 34 and 36, the circuit of FIG. 3 will operate to energize the relays R6 and R7 in response to a voltage applied to either end of the string; however lead 30 will always have to be positive with respect to lead 32. With no voltage applied from source 28, both relays R6 and R7 will be deenergized. However, as the voltage from source 28 is increased, relay R6 will initially conduct with transistor 38 conducting until the point is reached where Zener diode Z6 breaks down and conducts, thereby causing the voltage at the upper end of resistor 44 to rise and cut off transistor 38. The current through relay R6 is now diverted through diode D3 in bridge 34, diode D1 in bridge 36, and through relay R7 and transistor 40, which is now conducting. This will continue until the voltage source 28 reaches the point where Zener diode Z7 breaks down and cuts off transistor 40, whereupon the current through relay R7 will now be diverted through the next relay, and so on, until the entire string of relays is energized in sequence. With the arrangement of FIG. 3, increases in the control line voltage cause successive relay energizations with an approximately constant current load on the line.

In a subway train, for example, the relays R6, R7, and so on, would be on succeeding cars such that an increase or decrease in torque would be applied successively to each car starting from one end of the train. It will be appreciated, of course, that a subway train is only one use for the invention which has applicability to any system wherein it is necessary to energize a plurality of electrical utilization devices, whether they be lamps, motors or the like, in sequence.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In combination:
   means for providing a variable voltage which traverses between an initial and a final voltage level;
   first and second signal utilization devices with said first signal utilization device being connected to said means for providing a variable voltage;
   a first switch means connected in series with said first signal utilization device for providing a first signal conduction path for energizing said first signal utilization device when said first switch means is closed and said variable voltage is at a first level;
   a second signal conduction path connected in series with the conduction paths of said first and second signal utilization devices, said second signal conduction path being in an open condition when said first switch means is closed and being in a closed condition for providing an energization path for said second signal utilization device when said first switch means is open; and
   a first reverse voltage breakdown means operative with said means for providing a variable voltage and said first switch means, said first reverse voltage breakdown means controlling the opening and closing of said first switch means, said first switch means initially being in a closed condition and being switched to an open condition in response to said means for providing a variable voltage providing a level of voltage sufficient to cause said first reverse voltage breakdown means to breakdown.

2. The combination claimed in claim 1 including:
   a second switch means connected to series with said second signal utilization for providing a third signal conduction path for energizing said second signal utilization device when said second switch means is closed and said variable voltage is at a second level; and
   a second reverse voltage breakdown means operative with said signal conduction path and said second switch means, said second reverse voltage breakdown means controlling the opening and closing of said second switch means, said second switch means initially being in a closed condition and being switched to an open condition in response to the signal present on said signal conduction path being at a level of voltage sufficient to cause said second reverse voltage breakdown means to breakdown.

3. In combination:
   a source of variable voltage having an output terminal at which a voltage which varies between an initial and a final voltage level is provided;

a first signal utilization device having an input terminal connected to the output terminal of said source, and also having an output terminal;

a first switch having its conduction path connected between the output terminal of said first signal utilization device and said source, and also having a control terminal;

a first voltage breakdown means having one terminal connected to the output terminal of said source and the input terminal of said first signal utilization device, and having a second terminal connected to the control terminal of said first switch;

a second signal utilization device having an input terminal connected to the output terminal of said first signal utilization device, and also having an output terminal;

a second switch having its conduction path connected between the output terminal of said second signal utilization device and said source, and also having a control terminal; and a second voltage breakdown means having one terminal connected to the output terminal of said first signal utilization and the input terminal of said second signal utilization device, and having a second terminal connected to the control terminal of said second switch.

* * * * *